(12) United States Patent
Guillaume

(10) Patent No.: US 6,797,192 B1
(45) Date of Patent: Sep. 28, 2004

(54) PROCESS FOR THE MANUFACTURE OF TEMPERATURE-SENSITIVE POLYMERS WITH BINARY HEAT TRANSFER FLUID SYSTEM

(75) Inventor: Claude Andre Guillaume, Jodoigne Souveraine (BE)

(73) Assignee: Solutia, Inc., St. Louis, MO (US)

( * ) Notice: Subject to any disclaimer, the term of this patent is extended or adjusted under 35 U.S.C. 154(b) by 317 days.

(21) Appl. No.: 10/149,048

(22) PCT Filed: Nov. 28, 2000

(86) PCT No.: PCT/EP00/12077

§ 371 (c)(1),
(2), (4) Date: Jun. 4, 2002

(87) PCT Pub. No.: WO01/42389

PCT Pub. Date: Jun. 14, 2001

(30) Foreign Application Priority Data

Dec. 8, 1999 (EP) ............................................. 99124498

(51) Int. Cl.$^7$ ................................................. C09K 5/00
(52) U.S. Cl. .............................. 252/71; 252/73; 252/75
(58) Field of Search ............................... 252/71, 73, 75

(56) References Cited

U.S. PATENT DOCUMENTS

| 3,925,013 A | 12/1975 | Axon et al. |
| 3,933,958 A | 1/1976 | Hinrichs |
| 4,252,969 A | 2/1981 | Broering et al. |

FOREIGN PATENT DOCUMENTS

| WO | WO 89/07634 | 8/1989 |

Primary Examiner—Nechous Ogden
(74) Attorney, Agent, or Firm—Blackwell Sanders Peper Martin LLP

(57) ABSTRACT

The invention relates to a process for the manufacture of temperature-sensitive polymers having generally a melting point in the range of from 230° C. to 248° C. with the aid of a binary heat transfer fluid containing defined ranges of diphenyl and naphthalene. The invention also concerns articles made in accordance with the inventive process.

11 Claims, No Drawings

PROCESS FOR THE MANUFACTURE OF TEMPERATURE-SENSITIVE POLYMERS WITH BINARY HEAT TRANSFER FLUID SYSTEM

This invention concerns a process for the manufacture of temperature-sensitive polymers whereby a binary heat transfer fluid is used consisting essentially of biphenyl and naphthalene in defined ponderal ratios. The invention also contemplates plastic products made in accordance with the inventive process.

Heat transfer fluids, which can also be termed "heat carriers", are used to transfer heat energy between systems of different temperatures. Heat transfer fluids generally are eminently well-known and have been used commercially for a long time. The large majority of commercial transfer fluids, including Therminol® VP-1, (Solutia Inc.), Diphyle® (Bayer A. G.), Dowtherm® A (Dow Chemical) and Therm® S300 (Nippon Steel), all consist of a binary system of about 26% biphenyl and 74% diphenyloxide. Such heat transfer fluids are characterized by a boiling point of about 256° C. at atmospheric pressure and, in addition, exhibit desirable in-use properties including oxidative and thermal stability, good heat transfer properties, virtually no equipment corrosion and good economy. Irrespective of such benefits, boiling temperatures of commercial heat transfer fluids, generally above 250° C., are too high for the manufacture, including extrusion, of temperature-sensitive polymers, such as Nylon 6 and PTT (polytrimethylene terephthalate), and can lead to difficultly controllable polymer surface modifications and, consequently, undesirably altered in-use properties of the e.g. extruded article. In fact, a boiling point difference exceeding about 2° C. can lead to a different crystallization behavior of the polymer in the extruded article and thus yield an article exhibiting modified surface properties. The problem had been known for a long time and no satisfactory commercially-viable approaches for eliminating the difficulties have been made available up to now. Polymer manufacturing temperatures exceeding about 245° C., can be detrimental to the quality of the extruded article made from temperature-sensitive polymers. The lowering and control of the boiling temperature of heat transfer fluids was normally achieved by applying partial vacuum. However, the use of reduced pressures requires supplementary equipment and, more importantly, selected pressures can, and normally will, vary considerably during industrial polymer manufacturing operations to thus yield deficient polymer articles.

The prior art relating to the manufacture of extruded polymer articles, and the use of heat transfer fluids in such an arrangement, is well-known in the relevant technical community. U.S. Pat. No. 3,925,013 teaches the use of binary and ternary eutectic solvent mixtures for use in disperse dye carrier formulations to improve handling properties at ambient temperatures. A binary mixture of from 55–10% biphenyl and 30–45% naphthalene was found to possess a suitably lowered crystallization point so that dye carrier properties become easier. U.S. Pat. No. 5,397,491 describes heat transfer fluids, containing substituted diphenyl, exhibiting improved thermal stability at temperatures exceeding 300° C. JP-A-9145994 describes heat transfer fluids based on mixtures of alkyl naphthalenes and alkylbiphenyls, particularly combinations of diethyl biphenyl and diisopropyl naphthalene. WO 8907634 pertains to heat transfer agents consisting particularly of diphenylethers of terphenyl, biphenyldiphenyl ethers and naphthalene diphenylethers. JP-A-6968314 discloses heat transfer agents containing mixtures of biphenyl and/or naphthalene and diphenylether and terphenyl. WO 9850483 concerns heat transfer fluids exhibiting favorable thermal stability comprising a mixture of tetrahydro phenylethyl)-naphthalene and dibenzyl toluene.

It is therefore a main object of this invention to provide a new stable and efficient heat transfer fluid with a boiling point below 245° C.

It is another object of the invention to provide a process for the manufacture, with the aid of heat transfer fluid, of high quality extruded articles made from heat-sensitive polymers. It is still another object of this invention to provide a process for the manufacture of heat-sensitive polymers in the presence of a heat transfer fluid having, under atmospheric conditions, a boiling point below 245° C., in particular in the range of from 243° C. to 225° C. Yet another object of this invention relates to providing a manufacturing arrangement for extruding temperature-sensitive polymers in presence of a heat transfer fluid at a stable temperature, i.e. subject to minimal variations e.g. +/−1° C. Still another object of this invention relates to providing a processing arrangement for temperature-sensitive polymers to thus manufacture, e.g. extruded, polymer articles having uniformly stable and reproducible surface polymerization properties.

The above and other objects of this invention can now be achieved by means of a process for the manufacture of temperature-sensitive polymer whereby a heat transfer fluid is used consisting essentially of a mixture of biphenyl and naphthalene in defined proportions.

We have now discovered a process for the manufacture of temperature-sensitive polymers whereby a heat transfer fluid, consisting essentially of a mixture of diphenyl and naphthalene in ponderal ratios of from 65:35 to 55:45 is used. The most preferred heat transfer fluid for use in the inventive process contains biphenyl and naphthalene in a weight ratio of about 61:39. The invention also embodies polymer articles made in accordance with the inventive process.

Unless indicated to the contrary, percent indications, as used in the description and in the claims, refer to ponderal or weight percent, which terms are used interchangeably. The term "temperature-sensitive" or "heat-sensitive" polymers as used in the description and in the claims means polymers having a melting temperature, at ambient conditions, below 250° C., preferably in the range of from 230° C. to 248° C., more preferably 235° C. to 243° C. The term "manufacture" with respect to temperature-sensitive polymers, as used in the specification and claims, stands for known polymer manufacturing methods including extrusion, molding and equivalent methods. The terms "biphenyl" and "diphenyl" relate to the same compound and are used interchangeably throughout the description and claims.

The inventive process is particularly suitable for the manufacture of temperature-sensitive polymers including Nylon 6, Nylon 11, Nylon 12, polytrimethylene terephthalate, polybutene-1, polybutylene terephthalate, polyalkylenes such as polypropylene and high-density or low-density polyethylene, which polymers can at temperatures starting from 250° C. and above be subject to surface deficiencies and extrusion limitations.

Other polymers that may be advantageously processed according to the invention are poly(methylmethacrylate), polyacetal, polyionomer, EVA copolymer, cellulose acetate, hard polyvinylchloride and polystyrene or copolymers thereof. More particularly, copolymers of polyethylene-terephthalate may also be advantageously used with the heat transfer fluid of the invention.

Other temperature-sensitive polymers which can be manufactured beneficially by means of the process herein can be easily selected based on routine observations of the resulting articles made by means of conventional fluids having a boiling point of about 256° C. The heat transfer fluids suitable for use within the inventive process consists essentially of a binary mixture of biphenyl and naphthalene in a weight ratio of from 65:35 to 55:45, most preferably about 61:39.

The heat transfer fluid is characterized, under ambient pressure conditions, by a boiling point below 245° C., preferably between 243° C. and 225° C., more preferably between 242° C. and 228° C., and most preferably 238° C. The biphenyl component can be represented by commercial species having frequently a purity of 97% and more. Additive levels of reactive impurities including terphenyl, phenol and benzene are normally present in levels of less than 2%. The naphthalene comportent can be represented by the commercial product having normally a purity of more than 97%, usually more than 98%. The naphthalene comportent can contain minor levels, usually less than 2%, of impurities such as alkyl, benzene and alkylbenzene species. The heat transfer fluid can also contain additive levels of known compounds which are used for their known functionality in art-established levels.

As an example of such compounds, anti-oxidants in levels usually below 100 ppm can be added to the heat transfer fluid to thus augment the oxidative stability of the fluid.

The heat transfer fluid according to the invention may also be advantageously used for the processing of other polymers under non-ambient conditions, for example polyethylene terephthalate.

The following examples can serve to illustrate the benefits of the claimed technology and facilitate its understanding.

An important property of heat transfer fluids relates to their ability to mitigate thermal stresses and thus allow a beneficial utilisation during extended periods of time. The thermal stability of fluids used in this invention and prior art fluids have been measured in parallel thereby using the testing method in accordance with DIN 51528. The naphthalene/diphenyl combination used in this invention and prior art fluids listed below were heated in a (closed) ampoule (glass or metallic) at 345° C. for 480 hours. The comparative thermal stability data below express the quantity of cracked products formed, having a lower boiling point (LB) or a higher boiling point (HB) compared to the heat transfer fluid before the prolonged treatment in the closed ampoule. The testing results are measured with the gas chromatography simulation distillation method in accordance with ASTM D 2887.

| Example N° | Composition | Usage ° C. | LB-% | HB-% |
| --- | --- | --- | --- | --- |
| 1 (c) | Dibenzyltoluene | 350 | 7 | 3 |
| 2 (c) | Naphthalene-1,2,3,4-tetrahydro-6(1-phenyl) | 350 | 3.35 | 1.88 |
| 3 (c) | Hydrogenated terphenyl | 345 | 4.0 | 1.2 |
| 4 (c) | Biphenyl 26.5% Biphenyloxide 73.5% | 400 | 0 | 0 |

-continued

| Example N° | Composition | Usage ° C. | LB-% | HB-% |
| --- | --- | --- | --- | --- |
| 5 | Biphenyl 56% Naphthalene 44% | 345 | 0 | 0 |
| 6 | As Example N°5 | 345 | 0 | 0 |

The column "usage temp" lists the maximum bulk temperature of the fluid.
The abbreviation "(c)" after the Example number stands for comparative.

Example 3 (c) represents Therminol 66, manufactured by Solutia Inc. Example 4 (c) represents Therminol VP1, manufactured by Solutia Inc.

The data illustrate the improved thermal stability properties of the heat transfer fluid used in the inventive executions compared to a broad range of commercial executions.

The heat transfer properties of the listed fluid compositions (Examples 1–6) were determined in accordance with the heat transfer coefficient formula of DIN 4754 with parameters selected as follows:

temperature: 240° C.;
straight pipe with a diameter of 0.025 m;
fluid speed: 2.5 m/sec.
The data were as follows:

| Example N° | Composition | Volumetric Spec.Heat kJ/M3° K. | Heat transfer Coefficient W/M2K |
| --- | --- | --- | --- |
| 7 | as Example 5 | 2069 | 4275 |
| 8 | as Example 4 | 1862.1 | 3887 |

It thus appears that the inventive composition of Example 7 provides, compared to the prior art fluid of Example 8, a pump energy saving of 8% and a reduced (−10%) need of exchange surface. Nylon 6 plastic articles (rods) are extruded at a temperature in the range of 236–242° C. thereby using, in parallel a leading commercial fluid in accordance with Example 4 and the fluid of Example 5 in accordance with this invention. It is observed that the articles manufactured in accordance with the inventive technology show a uniformly polymerized surface, having a uniform color, compared to visible surface irregularities for articles made in accordance with the art.

What is claimed is:

1. A process for the manufacture of temperature-sensitive polymers, or mixtures thereof, whereby a heat transfer fluid is used consisting essentially of a binary mixture of diphenyl and naphthalene in ponderal ratios of biphenyl to naphthalene from 65:35 to 55:45.

2. The process in accordance with claim 1 wherein the temperature-sensitive polymer has, under ambient conditions, a melting point in the range of from 230° C. to 248° C. and wherein the boiling point of the binary heat transfer fluid is, under ambient conditions, equal to or less than 245° C.

3. The process in accordance with claim 2 wherein the boiling point of the heat transfer fluid is in the range of from 225° C. to 243° C.

4. The process in accordance with claim 3 wherein the temperature-sensitive polymer has a melting point in the range of from 235° C. to 243° C.

5. The process in accordance with claim 4 wherein the boiling point of the heat transfer mixture is in the range of from 228° C. to 242° C.

6. The process in accordance with claim 1 wherein the ponderal ratio of diphenyl to naphthalene is about 61:39.

7. The process in accordance with claim 6 wherein the heat transfer fluid has a boiling point of about 238 ° C.

8. The process in accordance with claim 1 wherein the temperature-sensitive polymer is selected from: Nylon 6, Nylon 11, Nylon 12, polytrimethylene terephthalate, polybutene-1, polybutylene terephthalate, polypropylene and high-density or low-density polyethylene, said polymer having a melting point, under ambient conditions, in the range of from 230° C. to 248° C.

9. The process in accordance with claim 1 wherein the temperature-sensitive polymer is polyethylene terephthalate or a copolymer thereof.

10. The process in accordance claim 1 wherein the temperature-sensitive polymer is selected from the group consisting of poly(methylmethacrylate), a polyacetal, a polyionomer, a EVA copolymer, cellulose acetate, hard polyvinylchloride and polystyrene.

11. A heat transfer fluid consisting essentially of a binary mixture of diphenyl and naphthalene in ponderal ratios of biphenyl to naphthalene from 65:35 to 55:45.

* * * * *